United States Patent [19]
Phillips et al.

[11] Patent Number: 5,580,491
[45] Date of Patent: Dec. 3, 1996

[54] FOAMABLE WHEY PROTEIN COMPOSITION

[75] Inventors: Lance G. Phillips, Ithaca; Scott E. Hawks, Moravia, both of N.Y.

[73] Assignee: Cornell Research Foundation, Inc., Ithaca, N.Y.

[21] Appl. No.: 90,274

[22] Filed: Jul. 13, 1993

[51] Int. Cl.$^6$ ............................ B01J 13/00; A23C 21/00; A23C 21/04
[52] U.S. Cl. ................................. 252/307; 426/564
[58] Field of Search .......................... 252/307, 356; 426/564, 583

[56] References Cited

U.S. PATENT DOCUMENTS

| | | | |
|---|---|---|---|
| 1,787,754 | 1/1931 | Meyer | 426/483 |
| 3,547,900 | 12/1970 | Dienst et al. | 530/378 |
| 3,891,571 | 6/1975 | Lambou et al. | 252/307 |
| 3,935,323 | 1/1976 | Feminella et al. | 426/564 |
| 3,944,680 | 3/1976 | van Pelt et al. | 426/564 |
| 4,087,518 | 5/1978 | Smith et al. | 424/70.14 |
| 4,089,987 | 5/1978 | Chang | 426/564 |
| 4,195,077 | 3/1980 | Marsh | 252/545 |
| 4,390,450 | 6/1983 | Gibson et al. | 252/307 |
| 4,460,571 | 7/1984 | Gomez | 424/71 |
| 4,552,773 | 11/1985 | Kahn et al. | 426/564 |
| 4,572,837 | 2/1986 | Poole et al. | 426/564 |
| 4,943,443 | 7/1990 | Evers | 426/569 |
| 5,053,219 | 10/1991 | Giddey et al. | 424/63 |
| 5,066,509 | 11/1991 | van den Hoven et al. | 426/583 |

FOREIGN PATENT DOCUMENTS 1166576  5/1984  Canada.

OTHER PUBLICATIONS

Derwent Abstract, AN 82–16080E/09, corresponding to EP–46326–A and CA 1 166 576 (1982).

Derwent Abstract, AN 82–16080E/09, corresponding to EP–46326–A and CA 1 166 576.

Chemical Abstracts, AN 111:180472 (1987).

Phillips, L. G., et al., *J. Food Sci.*, "Effects of Lysozyme, Clupeine, and Sucrose on the Foaming Properties of Whey Protein Isolate and β–Lactoglobulin", vol. 54, No. 3, pp. 743–747 (1989).

Phillips, L. G., et al., *J. Food Sci.*, "Neutral Salt Effects of Whey Protein Isolate Foams", vol. 56, No. 2, pp. 558–559 (1991).

Phillips, L. G., et al., *Food Hydrocolloids*, "effects of various milk proteins on the foaming properties of egg white", vol. 3, No. 3, pp. 163–174 (1989).

Phillips, L. G., et al., *J. Food Sci.*, "pH and Heat Treatment Effects on Foaming of Whey Protein Isolate", vol. 55, No. 4, pp. 1116–1119 (1990).

Phillips, L. G., et al., *J. Food Sci.*, "Standardized Procedure for Measuring Properties of Three Proteins, A Collaborative Study", vol. 55, No. 5 pp. 1441–1453 (1990).

Phillips, L. G., et al., *J. Food Sci.*, "Effects of Succinylation on β–Lactoglobulin Foaming Properties", vol. 55, No. 6, pp. 1735–1739 (1990).

*Primary Examiner*—Richard D. Lovering
*Assistant Examiner*—Daniel S. Metzmaier
*Attorney, Agent, or Firm*—Jones, Tullar & Cooper, P.C.

[57] ABSTRACT

An aqueous foamable composition is provided comprising an admixture of alcohol selected from the group consisting of methanol, ethanol, and isopropanol present in said composition in an amount of from about 0.5 to 35% by volume, an aqueous solution of whey protein isolate or concentrate present in an amount of at least 5% by volume and having a whey protein isolate or concentrate solids content of from about 1 to 10% by weight, and a fat present in a volume ratio of fat:aqueous whey solution of from about 1:1 to about 13:1, said composition having a pH of at least 10.5.

13 Claims, No Drawings

FOAMABLE WHEY PROTEIN COMPOSITION

BACKGROUND OF THE PRESENT INVENTION

The present invention is directed to a foamable whey protein composition.

Presently, almost five million tons of whey are produced each year in the United States as a waste product during the production of cheese. For each 100 pounds of milk consumed during the cheese production process, 90 pounds of waste liquid are produced consisting of a watery, protein-rich whey by-product. It is estimated that more than 50 percent of this whey by-product is disposed of each year as unused waste.

It has been difficult to find a commercially-acceptable use for the large amount of whey by-product which is discarded each year. Prior efforts to form useful foamed products, for example, from whey by-products have not met with much success in view of the fact that such by-products do not lend themselves to being readily foamed. Further, even if successful, such activities have been limited to non-fat containing compositions.

It would, however, be very advantageous to provide a process by which such whey by-products can be formed into a readily foamable (and protein-containing) composition, as it would be be useful to both reduce the amount of whey by-product disposed of as waste each year, as well as to provide an alternative to foamable compositions formed from egg whites.

OBJECTS AND SUMMARY OF THE INVENTION

It is accordingly one object of the present invention to provide a composition which is readily formed into a stable foam comprised of a protein-based composition.

It is further an object of the present invention to provide a fat-containing protein-based composition which is readily formed into a stable foam.

It is further an object of the present invention to provide a substitution for egg-white-based compositions which are readily formed into a stable foam.

In accordance with the present invention, there is thus provided an aqueous foamable composition comprising an alcohol having from 1–3 carbon atoms, said alcohol being present in said composition in an amount of from about 0.5 to 35% by volume, an aqueous solution of whey protein isolate or concentrate present in an amount of at least 5% by volume and having a whey protein isolate or concentrate solids content of from about 1 to 10% by weight, and optionally a fat present in a volume ratio of fat:aqueous whey solution of up to about 13:1, said composition having a pH of at least 5.0.

DETAILED DESCRIPTION OF THE PRESENT INVENTION

It has been found that a commercially-acceptable foamable composition may be prepared comprised of an aqueous solution of a whey protein isolate or whey protein concentrate, an alcohol having from 1–3 carbon atoms, and optionally a fat. The desirable foaming ability of the composition is believed to be due to the ability of the alcohol to readily encourage the whey protein isolate or concentrate to form a foam, even in the presence of significant amounts of fat. This result is not taught by the prior art.

The whey protein isolate or concentrate employed in the present invention is derived from cheese whey protein. The whey protein isolate or concentrate may be obtained by any process known to those skilled in the art. For example, the whey protein concentrate may be obtained by gel filtration of cheese whey, such as a partially delactosed cheese whey. The whey protein concentrate may also be obtained by other processes such as electrodialysis, reverse osmosis and/or ultrafiltration of cheese whey or partially delactosed cheese whey. The utililization of such processes is known in the art. For instance, U.S. Pat. No. 3,547,900 discloses a gel filtration process for the production of whey protein concentrates. Desirably, the whey protein concentrate is subjected to microfiltration to remove foam depressants which may be present prior to use in the present composition by microfiltration through a membrane of 0.22 mm size. The whey protein isolate is typically made by conventional ion exchange procedures.

The respective cheese source for the whey protein concentrate or isolate is not critical, and a variety of cheese sources are suitable. For instance, the whey protein concentrate or isolate may be derived from cheeses including but not being limited to cheddar cheese whey, Swiss cheese whey, mozarella cheese whey, and mixtures thereof.

Such cheese whey desirably contains the proteins β-lactoglobulin and/or α-lactalbumin, and/or the hydrolysis products of either β-lactoglobulin and/or α-lactalbumin, or mixtures thereof.

Whey protein isolate or concentrate is commercially available from several suppliers throughout the U.S. A suitable exemplary whey protein isolate is available from La Sueur under the designation BiPro.

The whey protein isolate or concentrate is present in the composition in an amount ranging from about 1 to about 10% whey protein solids, based on the total weight of water present in the composition.

The whey protein isolate or concentrate component is generally in the form of solids which must be rehydrated and dissolved in water to form an aqueous solution present in the composition. Such solids are preferably combined with water prior to combination with the alcohol and fat components, but may be dissolved in water in the presence of other previously-added components.

The alcohol employed in the present invention is an alcohol having from 1–3 carbon atoms. Suitable alcohols include but are not limited to methanol, ethanol and isopropanol. The alcohol component of the present invention is generally present in an amount ranging from about 0.5 to 35% by volume based on the total volume of the foamable composition.

The optional fat component of the present invention may be from a variety of sources. For instance, unsaturated triglycerides derived from vegetable sources or mineral oils may be employed with advantage. Other suitable fat components include butterfat, coconut oil, palm kernel oil as well as other fats that do not disrupt foam formation. The optional fat component is present in a volume ratio of fat:aqueous whey solution of up to 13:1.

Additional additives, while optional, may also be added depending upon the desired end use and properties of the foamed composition. Such additional additives include but are not limited to fragrances, stabilizers, antibacterial compounds, sugars, coloring agents, etc. For instance, as the foamed composition may be used as a dessert topping, flavors and sweeteners will be present with advantage. As the foamed composition may also be used to form a shaving cream, cosmetic additives suitable for use in such compositions may be added as appropriate. Such additional additives are added to the foamable composition in those amounts (generally minor) employed in such compositions and sufficient to provide the desired effect.

The foamable composition of the present invention may be made by simply admixing the respective components together in the presence of water until all solids are dissolved to form a foamable aqueous composition. Such admixing is undertaken under conditions of low or minimal shear in order to avoid premature foam formation. Once the aqueous solution of whey protein isolate or concentrate, the optional fat component and the alcohol component are combined to form an admixture (together with any optional additives), the pH of the resulting composition may be adjusted as required to be at least about 5, and preferably at least 10.5, by addition of suitable pH modifying agent. Suitable pH modifying agents are known to those skilled in the art and include but are not limited to various phosphate buffers, sodium hydroxide and other bases. The thus-formed composition contains at least 5% by volume water, with the ultimate percentage of water which is present varying depending upon the amount of other components such as fats or oils which are added. Once formed, a foam may readily be produced by using a suitable mixing device, sparging device or other aeration means. Advantageously, the alcohol component of the foam may be removed from the foam by evaporation upon passage of time.

It has been found that at a pH of at least 10.5, and most preferably at least 11.0, the composition will yield a foamed product almost instantaneously upon application of shear forces to the composition, and may exhibit enhanced physical properties in comparison to the properties of foams prepared from compositions having a lower pH. This is indeed a surprising result, especially when a fat is present in the composition, as a stable foam may be produced even in the presence of large amounts of fat. It has been generally the experience of those skilled in the art that it is difficult, if not impossible, to form a fat-containing protein-based composition which is susceptible to forming a stable foam. By the present invention, both by combination of the pH and the presence of the alcohol, it has been found that not only may a foam be readily produced, but that a foam may be formed despite a major amount of fat being present in the composition.

The present invention is illustrated by the following examples which are not intended to be limiting but merely exemplary of the scope of the invention.

EXAMPLE 1

Various foamable compositions were prepared containing varying amounts of alcohol to determine the effect of different amounts of alcohol upon foaming of the composition.

The extent of air incorporation into the foamed materials is measured as overrun (% change in density based on the initial solution density). The density is reduced as more air is incorporated. The stability of the foam is measured by the time required for 50% of the liquid to drain from the foam.

By way of comparison, the foaming characteristics of a whey protein isolate (5% solution at pH 7) were determined to be 1096% overrun and a foam stability of 21 minutes after whipping 20 minutes at high speed. The values were obtained after microfiltering the whey protein isolate solution through a 0.22 μm membrane.

Various whey protein isolate samples (1% microfiltered solution) containing either 0, 5, 12.5 or 35% ethanol by volume at pH 7 were prepared and whipped at 390 rpm using a Sunbeam Deluxe 235 watt Mixmaster (Sunbeam Corporation, Oak Brook, Ill.). The results are shown in Table 1 below:

TABLE 1

The Effects of Ethanol on the Foaming Properties of Whey Protein Solutions

| Ethanol (%) | Whipping Time (min.) | | | | Foam Stability (min.) |
| --- | --- | --- | --- | --- | --- |
| | 5 | 10 | 15 | 20 | |
| | Overrun (%) | | | | |
| 0 | 446 | 478 | 501 | 519 | 7.2 |
| 5.0 | 1057 | 1055 | 1058 | 1031 | 15.4 |
| 12.5 | 1189 | 1241 | 1278 | 1294 | 13.6 |
| 35.0 | 0 | 1355 | 1610 | 1707 | 11.6 |

A persistent foam with a remarkably high overrun (1355%) was observed with the 35% ethanol sample after 10 minutes whipping. The overrun continued a linear increase with increasing whiptime until a maximum overrun (1707%) was obtained after whipping 20 minutes at 390 rpm. The highest rate of overrun development was observed with 35% ethanol being added. The presence of ethanol also improved the stability of the foam. Higher concentrations of ethanol did not increase the foam stability beyond what was observed with 5% ethanol; however, greater overruns were obtained.

EXAMPLE 2

Samples of a foamable composition was prepared by admixing a microfiltered whey protein isolate aqueous solution (5% solids) to yield an admixture (100 ml) having a pH of either 10 or 11. To these samples were added separate 100 ml portions of vegetable oil. Ethanol was also added at this point to several samples. Each sample was whipped for 5 minutes in a Sunbeam mixer at 390 rpm speed to form a foam. The overrun and foam stability were determined for each sample and summarized in Table 2 below:

TABLE 2

The Effects of Ethanol, Fat and pH on the Foaming Properties of Whey Protein Isolate

| pH | Ethanol (%) | Vol. Ratio Fat:Aqueous Whey Soln. | Overrun (%) | Foam Stability (min.) |
| --- | --- | --- | --- | --- |
| 10 | 0 | 1:1 | 125 | 0.2 |
| 10 | 2 | 1:1 | 125 | 1.0 |
| 11 | 0 | 1:1 | 260 | 8.0 |
| 11 | 2 | 1:1 | 570 | 22.0 |

As shown in Table 2, the use of a pH of 11 enabled an extremely stable foam to be produced having the consistency of shaving cream.

EXAMPLE 3

A foamable composition was prepared by admixing a microfiltered whey protein isolate solution (5% solids) to yield an admixture (100 ml) having a pH of 11. To this mixture was added increasing volumes of vegetable oil while the ethanol concentration was maintained at 2%. The mixture was whipped for 2 minutes at 390 rpm in a Sunbeam mixer to form a foam. The overrun and visual characteristics of the foam were determined and are summarized in Table 3 below:

TABLE 3

The Effects of Fat on the Foaming Properties of Whey Protein Isolate

| pH | Ethanol (%) | Vol. Ratio Fat:Aqueous Whey Soln. | Overrun (%) | Visual Check of Foam Stability |
|---|---|---|---|---|
| 11 | 2 | 1:1 | 698 | good |
| 11 | 2 | 2:1 | 476 | good |
| 11 | 2 | 3:1 | 264 | good |
| 11 | 2 | 4:1 | 228 | consistency |
| 11 | 2 | 5:1 | 145 | of hand cream |
| 11 | 2 | 9:1 | 48 | |
| 11 | 2 | 13:1 | 18 | consistency of shortening |

Table 3 indicates that while increasing amounts of fat result in a decline in the overrun, the resulting stability of the foam increases due to the fact that the foam becomes more solid in nature.

EXAMPLE 4

A foamable composition was prepared by admixing a microfiltered whey protein isolate solution (5% solids) and ethanol to yield an admixture (100 ml) having a pH of 11 and an alcohol content of 1% by volume. To this mixture was added 25–30 ml of mineral oil. The resulting composition readily forms a foam upon mixing in a blender which foam is suitable for use as a shaving cream which does not breakdown when applied to the skin.

EXAMPLE 5

A foamable composition was prepared by admixing a microfiltered whey protein isolate solution (5% solids) and ethanol to yield an admixture (3000 ml) having a pH of 11 and an alcohol content of 1% by volume. To this mixture was added 900 ml of mineral oil. The whey protein/oil dispersion was heated to 74° C. for 10 minutes, ethanol added and the mixture homogenized at 2500 psi in a standard emulsifier having a small orifice. The mixture was cooled to 25° C. and a portion foamed. The rest of the mixture was stored at room temperature and foamed after 30 days. The initial material and the material stored for 30 days both readily formed a foam upon mixing in a blender suitable for use as a shaving cream which does not break down when applied to the skin.

EXAMPLE 6

A foamable composition was prepared by admixing a microfiltered whey protein isolate solution (5% solids) and ethanol to yield an admixture (100 ml) having a pH of 11 and an alcohol content of 1% by volume. To this mixture was added 25–30 ml of vegetable oil and 20 grams of powdered sugar. The final whipped mixture was in the form of a stable foam which had a pleasing taste which was suitable for use as a whipped topping.

EXAMPLE 7

A foamable composition was prepared by admixing a whey protein isolate solution (5% solids) and ethanol to yield an admixture (100 ml) having a pH of 11 and an alcohol content of 1% by volume. To this mixture was added 14% sodium sulfate and 10% sucrose. The mixture was foamed for 10 minutes and an aliquot of the foam placed in an oven with a temperature of 110° C. After 45 minutes the material was removed having a rigidity resembling a packing material or baked product.

What is claimed is:

1. An aqueous foamable composition comprising an admixture of an alcohol selected from the group consisting of methanol, ethanol and isopropanol present in said composition in an amount of from about 0.5 to 35% by volume, an aqueous solution of whey protein isolate or concentrate present in an amount of at least 5% by volume and having a whey protein isolate or concentrate solids content of from 1 to 10% by weight based on the total weight of water present in the composition, and a fat present in a volume ratio of fat:aqueous whey solution of from about 1:1 to about 13:1, said composition having a pH of at least 10.5.

2. The composition of claim 1 comprising a whey protein isolate.

3. The composition of claim 1 comprising a whey protein concentrate.

4. The composition of claim 1 wherein said alcohol is ethanol.

5. The composition of claim 1 including a fat which comprises an unsaturated triglyceride derived from a vegetable source.

6. The composition of claim 1 wherein said whey protein isolate or concentrate is derived from a cheese whey selected from the group consisting of cheddar cheese whey, Swiss cheese whey, mozarella cheese whey, and mixtures thereof.

7. A method of forming a foamed composition comprising providing an aqueous foamable composition comprising an admixture of an alcohol selected from the group consisting of methanol, ethanol and isopropanol present in said composition in an amount of from about 0.5 to 35% by volume, an aqueous solution of whey protein isolate or concentrate present in an amount of at least 5% by volume and having a whey protein isolate or concentrate solids content of from about 1 to 10% by weight based on the total weight of water present in the composition, and a fat present in a volume ratio of fat:aqueous whey solution of from about 1:1 about 13:1, said composition having a pH of at least 10.5, and aerating said composition to an extent sufficient to form a foam.

8. The method of claim 7 wherein a whey protein isolate is present in said composition.

9. The method of claim 7 wherein a whey protein concentrate is present in said composition.

10. The method of claim 7 wherein said alcohol is selected from the group consisting of methanol and ethanol.

11. The method of claim 10 wherein said alcohol is ethanol.

12. The method of claim 7 wherein said composition includes a fat which comprises an unsaturated triglyceride derived from a vegetable source.

13. The method of claim 7 wherein said whey protein isolate or concentrate is derived from a cheese whey selected from the group consisting of cheddar cheese whey, Swiss cheese whey, mozzarella cheese whey, and mixtures thereof.

* * * * *